United States Patent Office 3,252,994
Patented May 24, 1966

3,252,994
1,2-DIMETHYL-3-BENZYL-3-PROPIONOXY-PYRROLIDINE
Yao Hua Wu, Rolland Frederick Feldkamp, and Walter Gust Lobeck, Jr., Evansville, Ind., assignors to Mead Johnson & Company, Evansville, Ind., a corporation of Indiana
No Drawing. Filed Feb. 12, 1959, Ser. No. 792,713
2 Claims. (Cl. 260—326.3)

This invention relates to 3-acyloxy-3-aryl pyrrolidines and processes and more particularly relates to such compounds having the formula:

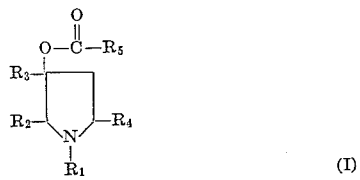

wherein $R_1$ is lower alkyl; $R_2$ is hydrogen or lower alkyl; $R_3$ is phenyl, benzyl, tolyl, anisyl or chlorphenyl; $R_4$ is hydrogen or lower alkyl; and $R_5$ is lower alkyl. When lower alkyl is referred to it is intended to mean methyl, ethyl, propyl, butyl, amyl and the like.

The above described compounds have utility in that they have unexpected analgesic properties and are useful as analgesics in the treatment of animals. The dosage for mammals is from about 12.5 to 100 milligrams per kilogram of body weight to obtain the desired effect and the compounds may be administered orally in the form of wafers, capsules, tablets and the like or intravenously in solution.

The compounds of this invention may be readily prepared by the acylation of the 3-aryl-3-pyrrolidinols described in Wu, Feldkamp and Gould application Serial No. 792,712, filed of even date herewith, now abandoned. Thus in accordance with this invention, the hydroxy group in the 3 position on the pyrrolidine ring is acylated by conventional procedures using the anhydride of an organic acid to produce the desired compounds.

It will be apparent from a consideration of the structure of the compounds of this invention that they readily form acid addition salts and these nontoxic and pharmaceutically acceptable compounds are also contemplated within the scope of this invention. Thus suitable acid addition salts are the hydrochlorides, hydrobromides, hydroiodides, sulfates, phosphates, acetates, citrates, succinates, tartrates, benzoates and the like. These acid addition salts may be prepared by conventional methods. For example, the hydrochloride salt may be prepared by treating an alcoholic solution of the base with an equivalent amount of an anhydrous alcoholic solution of hydrogen chloride.

It is again emphasized that the compounds used as starting materials for producing the compounds of this invention are those disclosed in application Serial No. 792,712 which in turn are produced from starting materials disclosed in Wu, Feldkamp and Lobeck application Serial No. 792,711, filed of even date herewith, and now abandoned. Reference is hereby made to those applications for processes of preparing the compounds which are used as starting materials for preparing the compounds of this invention.

In this specification all temperatures are expressed in degrees centigrade.

For a more complete understanding of this invention, reference will now be made to a number of specific examples showing the compounds prepared in accordance with the disclosure herein.

EXAMPLE I

*1-methyl-3-phenyl-3-propionoxypyrrolidine*

A mixture of 1-methyl-3-phenyl-3-pyrrolidinol (7.1 g., 0.04 mole), propionic anhydride (10.4 g., 0.08 mole) and pyridine (15.0 g., 0.19 mole) was heated to reflux with stirring for two hours. Removal of the excess reagents gave an oily residue, which was dissolved in 10 ml. of water. The aqueous solution was cooled in an ice bath and treated with 10 ml. of 40% sodium hydroxide with stirring. The mixture was extracted several times with ether. The combined ethereal extract was dried with anhydrous magnesium sulfate, filtered and concentrated. The residue was distilled in vacuo to obtain 1-methyl-3-phenyl-3-propionoxypyrrolidine as a colorless oil; B.P. 93–96° (0.2 mm.); $N_D^{25}$ 1.5131; yield, 7.3 g. (78.2%).

To prepare the hydrochloride, the free base was treated with an equivalent amount of anhydrous hydrogen chloride in ethanol and diluting the solution to cloudiness with isopropyl ether. The hydrochloride separated in 83.3% yield; M.P. 139–140°.

EXAMPLE II

*1,2-dimethyl-3-phenyl-3-propionoxypyrrolidine*

A mixture of 1,2-dimethyl-3-phenyl-3-pyrrolidinol (44.4 g., 0.23 mole), propionic anhydride (59.9 g., 0.46 mole) and pyridine (86.0 g., 1.1 moles) was refluxed for seven hours. After removing the excess reagent in a partial vacuum, the residue was dissolved in 45 ml. of water followed by 50 ml. of 40% sodium hydroxide. The mixture was extracted several times with ether. The combined ethereal extract was dried with anhydrous magnesium sulfate, filtered and concentrated. Fractional distillation of the residual oil yielded 52.5 g. (92.5%) of 1,2-dimethyl-3-phenyl-3-propionoxypyrrolidine as a colorless oil, B.P. 106–108° (0.2 mm.), $N_D^{25}$ 1.5130.

The above free base was dissolved in 50 ml. of anhydrous ethanol and treated with an equivalent amount of anhydrous hydrogen chloride. On diluting the solution with anhydrous ether to cloudiness and standing at 0°, 50.0 g. (83.4%) of the hydrochloride separated in needles, M.P. 192–194°.

EXAMPLES III AND IV

The process of Example II was repeated using acetic anhydride and butyric anhydride in place of the propionic anhydride to esterify the 1,2-dimethyl-3-phenyl-3-pyrrolidinol. The resulting 3-acetoxy derivative (Example III) had a boiling point of 106–108° C. at 0.2 mm. and its hydrochloride had a melting point of 192–194° C. The hydrochloride of the corresponding 3-butyryl derivative (Example IV) had a melting point of 184–186° C.

EXAMPLE V

*3-benzyl-1,2-dimethyl-3-propionoxypyrrolidine*

3-benzyl-1,2-dimethyl-3-pyrrolidinol (6.1 g., 0.03 mole) was mixed with 9.8 g. (0.06 mole) of propionic anhydride and 11.5 g. (0.145 mole) of dry pyridine. After refluxing for six hours, the mixture was heated in reduced pressure to remove the excess reagents. The residue was cooled in an ice bath to below 10° and 10 ml. of 40% sodium hydroxide added. This was followed by thorough ethereal extraction. The combined ethereal extract was dried over anydrous potassium carbonate, filtered and concentrated. 3-benzyl-1,2-dimethyl-3-propionoxypyrrolidine was obtained by fractionating the residue in vacuo as a colorless viscous oil; B.P. 98–105° (0.15 mm.). Yield: 7.05 g. (89.8%).

The hydrochloride was obtained in 84.3% yield from the free base and recrystallized from ethanol, M.P. 224–226°.

EXAMPLE VI

*1,5-dimethyl-3-phenyl-3-propionoxypyrrolidine*

1,5-Dimethyl-3-phenyl-3-pyrrolidinol (7.7 g., 0.04 mole), propionic anhydride (10.5 g., 0.08 mole) and pyridine (15 g., 0.19 mole) were mixed and refluxed for seven hours. The residue obtained after removal of the excess reagents was dissolved in 10 ml. of water, followed by 10 ml. of 40% sodium hydroxide, while the temperature was kept under 10°. The mixture was extracted several times with ether. The combined ethereal extract was dried with anhydrous magnesium sulfate, filtered and concentrated. The residue was distilled in vacuo to collect 7.5 g. (75.5%) 1,5-dimethyl-3-phenyl-3-propionoxypyrrolidine as a thick oil, B.P. 94–100° (0.2 mm.).

The hydrochloride was obtained by treating the free base in ethanol with an equivalent amount of anhydrous hydrogen chloride; M.P. 142–144°; yield, 51.6%.

EXAMPLE VII

*1,2-dimethyl-3-o-tolyl-3-propionoxypyrrolidine*

A mixture of 1,2-di-methyl-3-o-tolyl-3-pyrrolidinol (8.2 g., 0.04 mole), propionic anhydride (10.5 g., 0.08 mole) and pyridine (15 g., 0.19 mole) was refluxed for ten hours. The residue, obtained by removing the excess reagents, was cooled in an ice bath and treated with 10 ml. of water, followed by 10 ml. of 40% sodium hydroxide. The mixture was extracted with ether. 1,2-dimethyl-3-o-tolyl-3-propionoxypyrrolidine was isolated from the ethereal extract by the usual procedure, B.P. 125–130° (0.5 mm.); $N_D^{25}$ 1.5202; yield, 8.4 g. (79.6%).

The free base was dissolved in a small amount of ethanol and treated with an equivalent amount of anhydrous hydrogen chloride. The resulting solution was charcoaled and diluted with anhydrous ether to cloudiness. On standing at 0°, 7.2 g. (71.4%) of the hydrochloride crystallized out in needles, M.P. 179–181°.

EXAMPLES VIII AND IX

The process of Example VII was repeated using 3-p-anisyl- and 3-m-chlorophenyl-1,2-dimethyl-3-pyrrolidinol. The 3-p-anisyl derivative (Example VIII) had a boiling point between 110–115° C. at 0.2 mm. and its hydrochloride had a melting point of 151–153° C. The 3-m-chloro derivatives (Example IX) had a boiling point between 120–125° C. at 0.35 mm. and its hydrochloride had a melting point of 177–179° C.

EXAMPLE X

*1-ethyl-2-methyl-3-phenyl-3-propionoxypyrrolidine*

A mixture of 1-ethyl-2-methyl-3-phenyl-3-pyrrolidinol (5.5 g., 0.026 mole), propionic anhydride (6.8 g., 0.05 mole) and pyridine (9.5 g., 0.12 mole) was refluxed for twenty-one hours. The residue obtained after removing the excess reagents was dissolved in 10 ml. of water, and adjusted to pH 13 by adding 40% sodium hydroxide. The mixture was extracted with ether. 1-ethyl-2-methyl-3-phenyl-3-propionoxypyrrolidine was separated from the ethereal extract by the usual procedure. It had B.P. 100–106° (0.15 mm.), $N_D^{25}$ 1.5135; and weighed 5.3 g. (78.4%).

The hydrochloride was prepared by adding an equivalent amount of anhydrous hydrogen chloride to an ethanol solution of the free base and diluting the solution with anhydrous ether; yield, 80.4%. It had a M.P. 209–211°.

While several particular embodiments of this invention are shown above, it will be understood, of course, that the invention is not to be limited thereto, since many modifications may be made, and it is contemplated, therefore, by the appended claims to cover any such modifications as fall within the true spirit and scope of this invention.

We claim:
1. 1,2-dimethyl-3-benzyl-3-propionoxypyrrolidine hydrochloride.
2. 1,2-dimethyl-3-benzyl-3-propionoxypyrrolidine.

References Cited by the Examiner

UNITED STATES PATENTS

| | | | |
|---|---|---|---|
| 2,765,314 | 10/1956 | Schmidle et al. | 260—294.3 |
| 2,784,192 | 3/1957 | Schmidle et al. | 260—294.3 |
| 2,824,875 | 2/1958 | Elpern | 260—294.3 |
| 2,846,437 | 8/1958 | Elpern | 260—294.3 |
| 2,850,500 | 9/1958 | Elpern | 260—294.3 |
| 2,878,264 | 3/1959 | Lunsford | 260—326.5 |
| 2,880,211 | 3/1959 | Elpern | 260—294.3 |
| 2,987,517 | 6/1961 | Martin et al. | |

FOREIGN PATENTS

| | | |
|---|---|---|
| 483,258 | 4/1938 | Great Britain. |
| 629,196 | 9/1949 | Great Britain. |
| 159,630 | 7/1957 | Sweden. |

OTHER REFERENCES

Richer's "Organic Chemistry," vol. 3, pp. 3 to 4 (1923).

HENRY R. JILES, *Acting Primary Examiner.*

IRVING MARCUS, H. J. LIDOFF, WALTER A. MODANCE, JOSE TOVAR, *Assistant Examiners.*